United States Patent
Foladare et al.

(10) Patent No.: US 6,516,060 B1
(45) Date of Patent: *Feb. 4, 2003

(54) ADVANCED CALL SEQUENCING SERVICE

(75) Inventors: Mark Jeffrey Foladare, Kendall Park, NJ (US); Shelley B. Goldman, East Brunswick, NJ (US); David Phillip Silverman, Somerville, NJ (US); Shaoqing Q. Wang, Middletown, NJ (US); Robert S. Westrich, Middletown, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,223

(22) Filed: Jun. 12, 1998

(51) Int. Cl.[7] .................................................. H04M 3/42
(52) U.S. Cl. ............................. 379/211.03; 379/211.02; 379/90.01; 379/209.01
(58) Field of Search ................................ 379/209, 210, 379/211, 355, 350, 209.01, 211.01, 211.02, 211.03, 212.01, 355.01, 90.01, 92.04, 93.05

(56) References Cited

U.S. PATENT DOCUMENTS

| | | | | |
|---|---|---|---|---|
| 5,222,125 A | * | 6/1993 | Creswell et al. | 379/88.21 |
| 5,467,385 A | * | 11/1995 | Reuben et al. | 379/88.19 |
| 5,487,111 A | * | 1/1996 | Slusky | 379/211 |
| 5,579,375 A | * | 11/1996 | Ginter | 379/211 |
| 5,764,747 A | * | 6/1998 | Yue et al. | 379/211.03 |
| 5,896,448 A | * | 4/1999 | Holt | 379/221.03 |
| 5,978,469 A | * | 11/1999 | Benson | 379/377 |
| 6,005,930 A | * | 12/1999 | Baiyor et al. | 379/211 |
| 6,058,178 A | * | 5/2000 | McKendry et al. | 379/212 |
| 6,072,867 A | * | 6/2000 | Lieuwen | 379/220 |

OTHER PUBLICATIONS

Generic Requirements for an SPCS to Customer Premises Equipment Date Interface for Analog Display Services, Bellcore Technical Reference (TR–NWT–001273), Issue 1, Dec. 1992.

"ISDN Architecture" AT&T Technical Journal, vol. 65, No. 6, Issue 1, pp. 1–55, Jan./Feb. 1986.

"Conversant 1 Voice System: Architecture and Applications", AT&T Technical Journal, vol. 65, Issue 5, pp. 34–47, Sep./Oct. 1986.

"The 5ESS Wireless Mobile Switching Center", AT&T Technical Journal, vol. 72, No. 4, Jul./Aug. 1993, pp. 38–47.

* cited by examiner

Primary Examiner—Fan Tsang
Assistant Examiner—Ovidio Escalante

(57) ABSTRACT

A communications system is designed to prevent premature termination of the sequencing process for sequencing calls by a) disabling voice mail features for all calls in the sequence, except for the last call in such sequence and b) insuring that the sequencing subscriber is available to personally answer the sequencing call at each telephone number in the sequence to which such sequencing call is completed.

5 Claims, 4 Drawing Sheets

ADVANCED CALL SEQUENCING SERVICE

TECHNICAL FIELD

This disclosure relates to communications systems and, more particularly, to a method and a system for completing sequencing calls.

BACKGROUND

Call sequencing is a communications service feature that has been available to communications service subscribers over the last few years. In essence, call sequencing allows subscribers to establish a sequence of subscriber-selected destination telephone numbers at which such subscribers can be reached. In actual implementation of the call sequencing feature, a call destined for a call sequencing subscriber is successively directed to different pre-selected destination telephone numbers in the sequence until either the subscriber is reached, or all the destination telephone numbers listed in the sequence have been exhausted. Such a call is hereinafter referred to as a "sequencing call". Usually, call sequencing subscribers elect to include in the sequence certain destination numbers such as their office telephone number, their wireless telephone number and their home telephone number, to name a few. Ordinarily, those different telephone numbers are stored in a communications carrier's database for retrieval in the order or sequence pre-selected by the subscriber. Typically, the communications carrier will provide the call sequencing subscriber with a database-queried telephone number, such as an "800" number. When a caller dials the 800 number, the communications system, upon receiving such number, translates it to a first destination number in the sequence to which the sequencing call is initially completed. When the subscriber cannot be reached at the first telephone number in the sequence due to conditions such as a ring-no-answer or a busy-line condition, the communications system automatically initiates a call to the second telephone number in the sequence. This process continues until either a call supervision tone is received by the communications system (e.g., the call is answered) or all the destination numbers listed in the sequence have been exhausted. The last destination number in the sequence is usually associated with an end-user device that is coupled to the subscriber's voice mail system that is designed to receive and store any message that a caller may wish to leave for the subscriber.

In all too many situations, however, the communications system fails to proceed with the sequential flow of completing calls to the destination numbers in the sequence. Interruption in the sequential flow occurs, for example, when a call answering device or voice messaging system is coupled to a telephone set associated with one of the destination numbers in the sequence, and such number is not the last destination number in the sequence. In such instance, the answering device delivers an announcement to the caller thereby transmitting the answer supervision signal—indicative of a call completion—to the communications system. In response to receiving the answer supervision signal from the voice mail system, such as an answering machine, the communications system stops the process of dialing any remaining number(s) in the sequence. As a result, the sequencing subscriber who is available to answer a call directed at any of the remaining telephone numbers listed in the sequence, is denied an opportunity to communicate immediately with the caller.

Another situation, in which the sequencing process is prematurely terminated, occurs when the communications system completes a call to a destination number other than the last destination number in the sequence and somebody other than the sequencing subscriber answers the call destined for a call-sequencing subscriber. Thus, a problem of the prior art is the premature termination of the sequencing process before a subscriber has an opportunity to answer a sequencing call.

SUMMARY

The present disclosure is directed to a communications system that is designed a) to ascertain whether a sequencing subscriber is available to answer a sequencing call at a destination number in the sequence, and in response to receiving a signal indicative of the unavailability of such subscriber b) to forward the sequencing call to the next destination number in the sequence, and c) to continue forwarding the call to the next destination number in the sequence until the called party is reached or all the destination numbers in the sequence have been exhausted.

In a first embodiment of the principles disclosed herein, an announcement prompts a called party to provide affirmative information indicative of whether such called party is the sequencing subscriber for whom a sequencing call is destined. When the communications system receives no such information from the sequencing subscriber, the communications system proceeds to forward the call to the next phone number in the sequence while delivering the same prompting announcement. This process continues until either information indicative of the sequencing subscriber's availability is received, or all the phone numbers in the sequence have been exhausted.

In a second embodiment of the principles disclosed herein, a communications carrier's terminating switch is arranged to disable for a sequencing call any voice mail feature that may be associated with a telephone number to which the terminating switch completes a call. This may be accomplished, for example, by the terminating switch transmitting an in-band or out-of-band signal to a device connected to the telephone set to which the call is completed. The in-band or out-of-band signal may—in addition to temporarily disabling the voice mail feature—indicate, for example, that the call is destined for a particular sequencing subscriber, and no other person but the subscriber should answer the call. If the terminating switch does not receive an answer supervision signal indicative of the availability of the called party, the communications system then forwards the call to the next phone number in the sequence while repeating the process of disabling the voice mail feature, if appropriate. The call forwarding process and the voice mail disabling process continue until the called party is reached or the last number in the sequence remains to be dialed. For the last number in the sequence, the terminating switch refrains from transmitting any voice mail disabling signal, thereby allowing any voice messaging system or device to present to the caller a greeting message inviting the caller to leave a message for the sequencing subscriber. Advantageously, by preventing the different calls in the sequence from being completed, the second embodiment allows the caller or sequencing subscriber to avoid the costs associated with the different calls.

DETAILED DESCRIPTION

Figure 1:
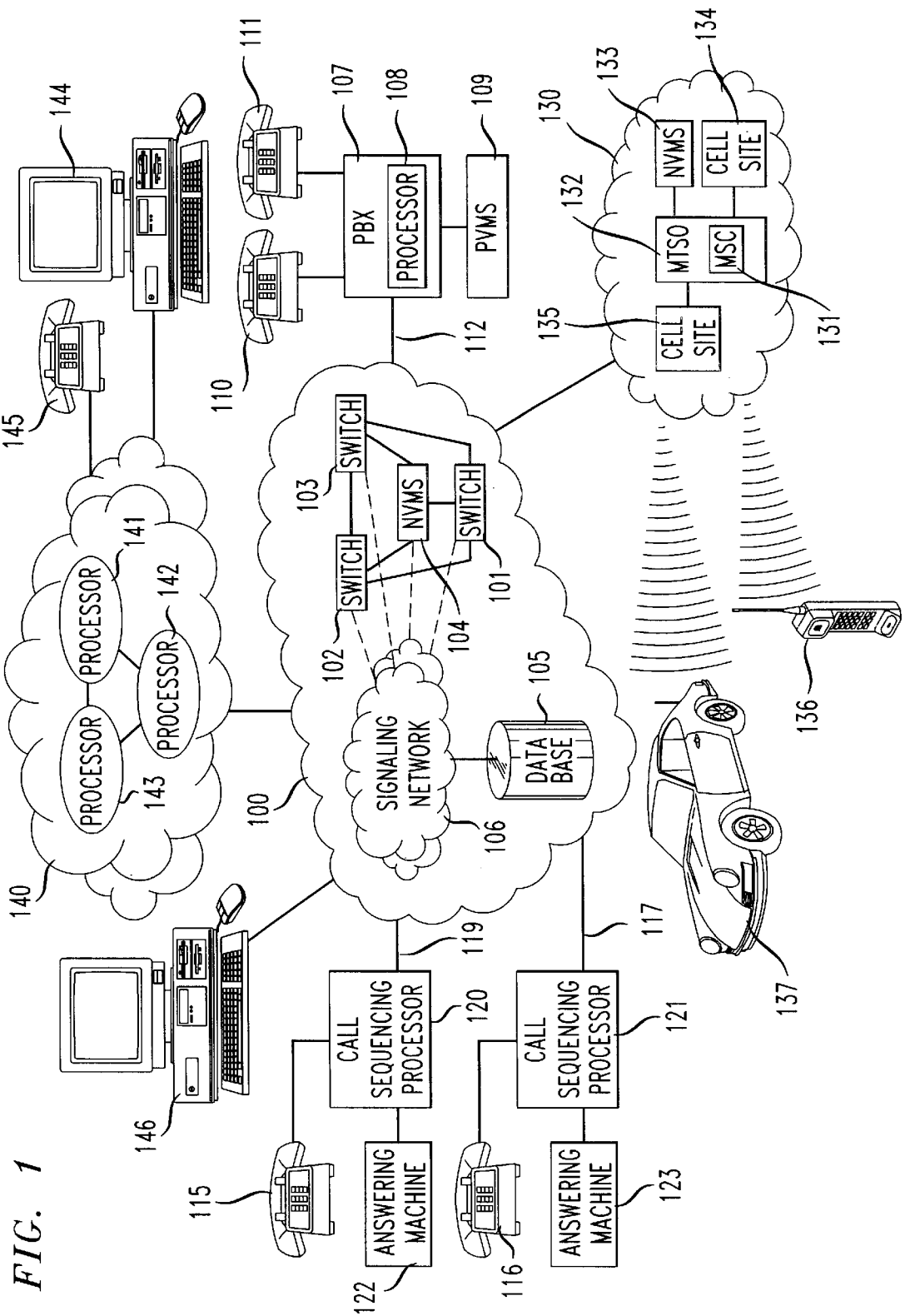
FIG. 1 shows in block diagram format an illustrative communications system arranged in accordance with the principles disclosed herein to allow a call to be forwarded to a sequence of telephone numbers in response to a determination that the called party for whom the call is destined is unavailable at a first number in the sequence.

Shown in the block diagram of FIG. 1 is a communications system comprised of a landline telephone network 100, a data network 140 and a wireless network 130. Landline telephone network 100 includes network office switches 101, 102 and 103 connected to a Network-based Voice Messaging System (NVMS) 104. Network Office switches 101, 102 and 103 are processor-controlled, software-driven switching systems that are arranged to complete calls to telephone sets such as analog telephone set 116 using Plain Old Telephone Service (POTS) facility 117. Network Office switches 101, 102 and 103 also complete calls to digital end-user devices such as digital telephone set 115 via Integrated Services Digital Network (ISDN) facility 119. The latter is a Basic Rate Interface (BRI) loop, which has two bearer (B) channels and one data (D) channel. Signaling information for the bearer channels is transmitted via the D channel. POTS facility 117 may also receive signaling information in-band using, for example, the Analog Display Services Interface (ADSI) standardized protocol. As is well known in the art, the ADSI standards allow a network office switch, such as switches 101 to 103, to send limited amounts of data, such as signaling information, to an analog telephone set, typically between the first and second rings. Further information on the ADSI standards can be found in "*Generic Requirements for an SPCS to Customer Premises Equipment Data Interface for Analog Display Services*" BellCore Technical Reference (TR-NWT-001273), Issue 1, December 1992. In an actual implementation of the principles disclosed herein, network office switches 101 to 103 may use the ADSI or ISDN protocol to forward limited amounts of information (e.g., signaling information) to a device associated with a destination number to which a call is to be completed. Such information may be displayed on a screen of the device (such as a caller-id box). Facilities 117 and 119 are also coupled to call sequencing processors 120 and 121 which are, in turn, connected to answering machines 122 and 123, respectively. The features and functionality of call sequencing processors 120 and 121 are described below with reference to FIG. 2.

Also shown in FIG. 1 is Private Branch Exchange (PBX) 107 that is connected to land-line telephone network 100 via trunk 112 that is an ISDN Primary Rate Interface (PRI) transmission facility. As is well known in the art, one of the key attributes of the ISDN PRI standard is the support for twenty-four 64 Kilobits per second (Kbps) channels over a standard DS-1 facility. Of particular importance is the portion of the standard requiring the use of twenty-three of those channels, called bearer (B) channels, to carry voice or data information, and one common channel, called data (D) channel, to carry signaling information exclusively for the other twenty-three bearer channels. In the present system, the D channel is used, for example, to carry signaling information associated with a call, such as calling and called party numbers, and supervisory signals, such as flash hook and terminating signals. Additional information regarding ISDN standards in general, and PRI interface in particular, can be found in a series of articles that appeared in *AT&T Technical Journal*, Vol. 65, No. 6, Issue 1, pp. 1–55 January/February 1986.

PBX 107 is a premises-based switching system that is arranged to switch internal calls between telephone sets 110 and 111. PBX 107 not only receives calls along with call setup information from land-line telephone network 100 for completion to telephone sets 110 and 111 but also forwards calls and call setup information to landline telephone network 100 for processing by such network. PBX 107 is also coupled to Premises-based Voice Messaging System (PVMS) 109. The latter includes a call processing unit that is arranged to execute a set of scripts stored therein to answer an incoming call, and to greet a caller with a pre-recorded voice announcement inviting the caller to leave a message for a called party. PVMS 109 typically delivers such pre-recorded voice announcements to callers after receiving from PBX 107 an appropriate signal generated therein after a predetermined number of rings for unanswered calls. A premises-based voice messaging system may be implemented using the Lucent Technologies Intuity® Voice System whose architecture and features are described in *AT&T Technical Journal* Vol. 65, Issue 5, pp. 34–47, September/October 1986.

At the heart of PBX 107 is processor 108 that is arranged to analyze signaling information associated with a call to ascertain how to process such call. For example, processor 108 may direct a call to PVMS 109 for voice messaging service after a predetermined number of rings. Conversely, processor 108 may prevent a call from being directed to PVMS 109 regardless of the number of rings associated with such call. For example, processor 108 may prevent the voice messaging capabilities of PVMS 109 from being activated for a call, based on the signaling information associated with such call. One such signaling information may be the position of a call in a sequence, hereinafter referred to as "position data". Additional information on position data is provided below.

Landline telephone network 100 also includes a signaling network 106 to which is connected a database 105. Signaling network 106 is comprised of a plurality of interconnected packet switching nodes (not shown) that route call processing messages to their appropriate destinations according to a defined protocol, such as the well-known Common Channel Signaling (CCS) protocol. For example, when one of the network office switches 101 to 103 receives a call that is destined for a sequencing subscriber, the switch transmits to database 105 information associated with the call, such as the calling and called party numbers. The latter is a processor-controlled, software-driven data base management system that stores a sequence of pre-selected destination telephone numbers for a sequencing subscriber. Database 105 exchanges signaling information with network office switches 101 to 103 via signaling network 106. Signaling information exchanged between database 105 and network office switches 101 to 103 may include, for example, a sequence of destination numbers associated with a sequencing subscriber 800 number and the number of destination numbers in the sequence Such signaling information may also include supervisory signals, such as signals indicative of call completion, ring-no-answer or busy line conditions that may be transmitted by a terminating network office switch to database 105. In an actual implementation of the principles disclosed herein, database 105 is arranged to translate an 800 number to a sequence of destination numbers that are associated with a call sequencing subscriber for whom a sequencing call is destined. Such destination numbers are then forwarded to one of the network office switches 101 to 103 for processing of the sequencing call. Alternatively, database 105 may forward the destination numbers one at a time, to one of the network office switches 101 to 103. In the latter case, the switch in question has to send a signal to a database 105 to request the next destination number when the call at the previous destination number could not be completed due to ring-no-answer or busy-line condition.

Landline telephone network 100 also includes a Network-Based Voice Messaging System (NVMS) 104. The latter includes a call processing unit that is arranged to execute a set of scripts stored therein to answer an incoming call, and to greet a caller with a pre-recorded voice announcement inviting the caller to leave a message for a called party. A network-based voice messaging system may be implemented using the Lucent Technologies Conversant® Voice System whose architecture and features are described in an article entitled "Conversant Voice System and Applications" by Pardue et al. in *AT&T Technical Journal* Vol. 65, Issue 5, pp. 34–47, September/October 1986. When one of the network switches 101 to 103 completes a call to a called party, the switch "listens" to terminating supervisory signals or call progress tones, e.g., busy, ring-no-answer tones, in order to take specific actions. For example, when one of the network switches 101 to 103 detects a signal, such as a ring-no-answer signal, the switch "infers" that the called party is unavailable. If the called party is a call sequencing subscriber, the switch may direct a call to the next destination number in the sequence. Alternatively, the switch may transfer the call to NVMS 104 which delivers an announcement to the caller inviting him or her to leave a message for the called party, as explained in detail below.

Also shown in FIG. 1 is an illustrative representation of wireless communications network 130 which is comprised of interconnected Mobile Telephone Switching Offices (MTSO), and cell sites that are arranged to complete calls to and from wireless telephone sets. For the sake of simplicity, only MTSO 132 and cell sites 134 and 135 are shown in FIG. 1.

At the heart of wireless communications network 130 is Mobile Telephone Switching Office (MTSO) 132 which is comprised of a set of modular hardware and software components designed to switch calls, administer the allocation of radio channels within wireless communications network 130, and to coordinate paging of wireless telephone sets 136 and 137 for calls destined for those sets. MTSO 132 also coordinates hand-off of calls (in progress) from cell site 134 to cell site 135, as wireless telephone sets 137, for example, leaves one cell to cross the borders of another cell. One of the modular components of MTSO 132 is Mobile Switching Center (MSC) 131 which is typically a processor-controlled software-driven switching system arranged to provide seamless communications paths by bridging radio channels and wired channels for calls routed over wireless communications network 130 and land-line network 100. A description of a Mobile Switching Center and associated connections to a wireless network can be found in an article by Gauldin et al. entitled *"The 5ESS® Wireless Mobile Switching Center"* AT&T Technical Journal, Volume 72, No. 4, July/August 1993 pp. 38–47.

Cell sites 134 and 135 are comprised of base stations (not shown) that include hardware and software components that perform call setup and switching functions for calls originated from, or destined for, wireless end-user devices 136 and 137. The call setup and switching functions of the base stations include allocation and administration of radio channels for active wireless end-user devices, coordination of call handoffs from one cell site to another, and tearing down a connection at the end of a call. Wireless communications network 130 also includes NVMS 133, which offers features and provides functionality similar to NVMS 104.

FIG. 1 also shows a data network 140 that is comprised of a number of interconnected processors 141, 142 and 143. These processors are loaded with suitable software that allows the processors to deliver Internet telephony services to end-user devices, such as personal computer 144. Such Internet telephony services may include, for example, Personal, Computer (PC) to Personal Computer (PC) voice communications between PCs 144 and 146. One of the processors 141, 142 and 143 of data network 140 may also be loaded with Internet telephony gateway software which operates in conjunction with specialized hardware to allow telephone set 145 to communicate with users of telephone set 115 and/or 116 via data network 140. In essence, the gateway software loaded on one of the processors 141 to 143 digitizes analog audio signals received from telephone sets 116 and 115 that are then transmitted through data network 140 and land-line network 100 for communications with each other.

Figure 2:
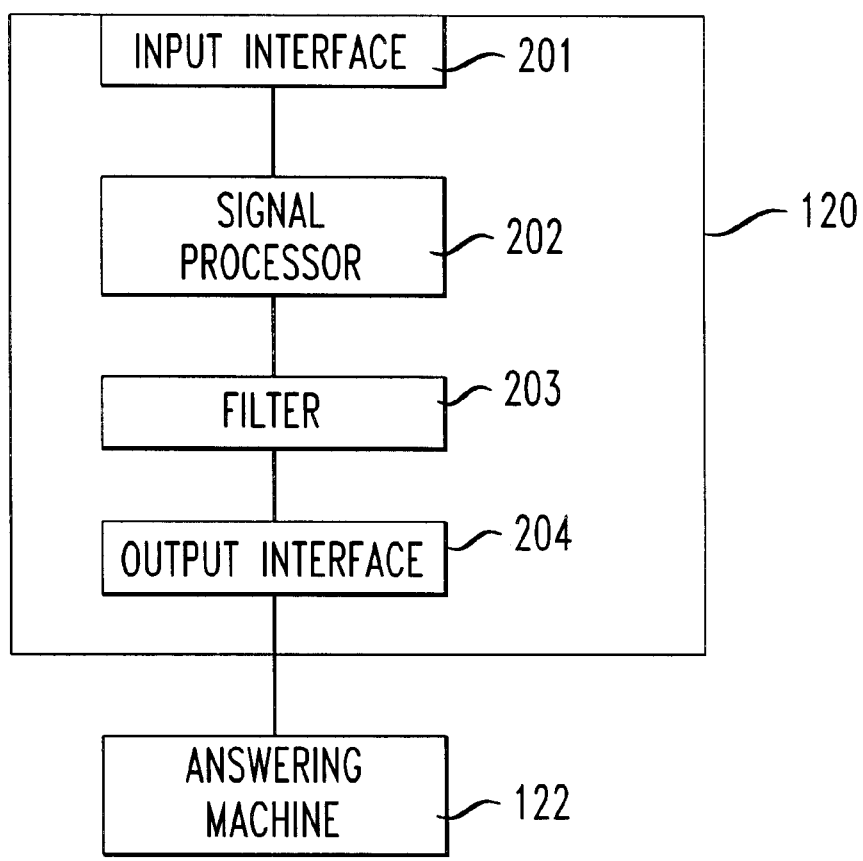
FIG. 2 shows a schematic diagram of a communications device arranged in accordance with the principles disclosed herein to disable voice mail service for a call.

FIG. 2 shows a schematic diagram of call sequencing processor 120 that is arranged in accordance with the principles disclosed herein to disable voice messaging service for a call. Call sequencing processor 120 includes line physical interface 201, signal processor 202, filter 203 and output interface 204. Line physical interface 201 is a receiver that is arranged to transfer signals received from landline communications network 100 to signal processor 202. Signals received by line physical interface 201 include for example, data such as calling party number, position data, and ringing tone signal, to name a few. Data received by signal processor 202 is analyzed therein to determine whether filter 203 should allow the accompanying ringing signal to reach answering machine 122. Features and functionality provided by call sequencing processor 120 are described with more particularity in conjunction with a description of FIG. 3 below.

Figure 3:
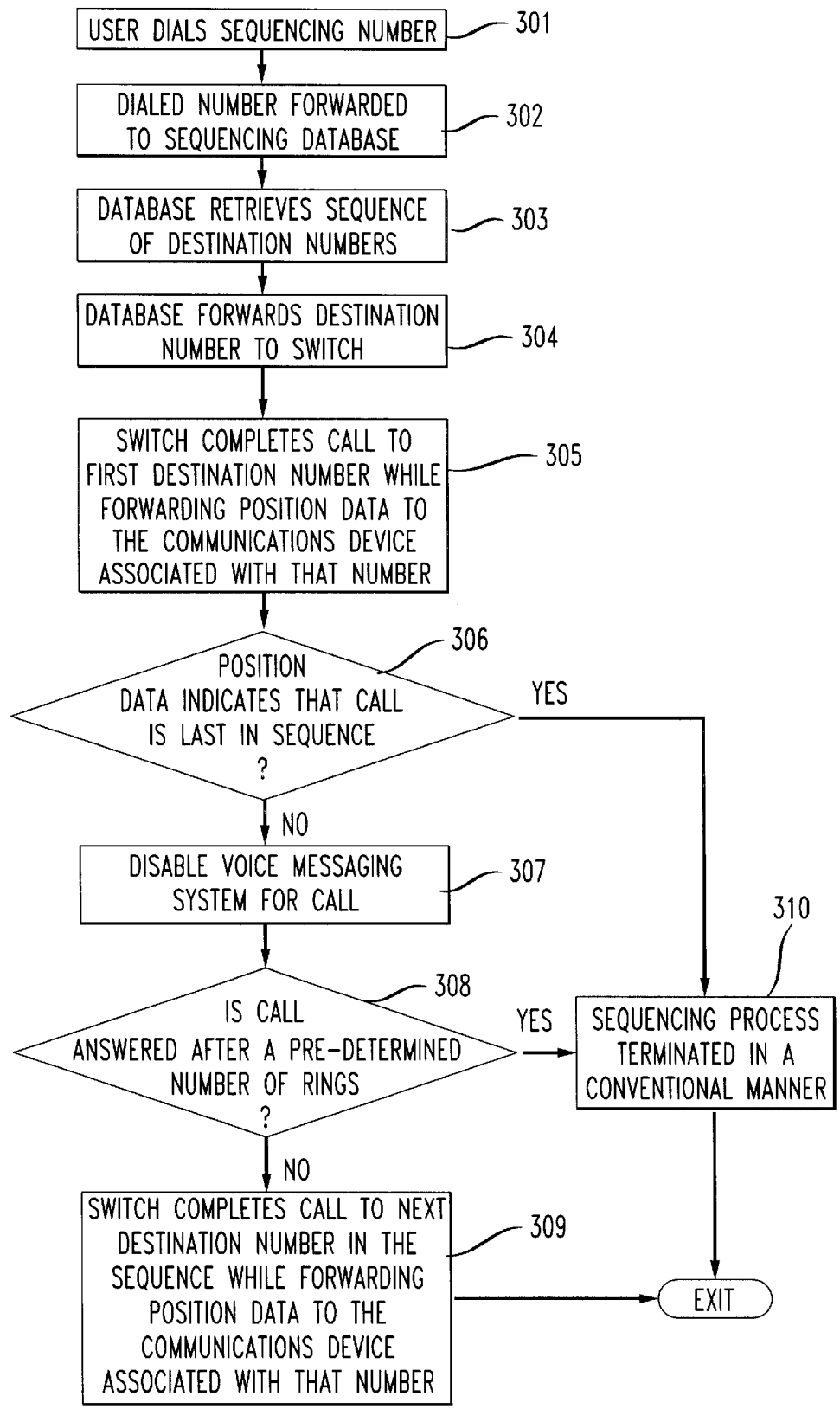
FIGS. 3 and 4 present in flow diagram format actions taken and decisions formulated by different components of FIG. 1 to implement the principles disclosed herein.

FIG. 3 presents in flow diagram format actions taken and decisions formulated by different components of FIG. 1 to implement the principles disclosed herein. The process contemplated by this disclosure is initiated in step 301, when a user who wishes to communicate with a sequencing subscriber dials a sequencing telephone number, such as a toll-free number. The calling and called party numbers for the in-coming call are received by one of the switches 101 to 103 (switch 101, for example) in land-line network 100. Upon receiving the calling and called party numbers, switch 101, in step 302, transmits such numbers to database 105 via signaling network 106. A query is then launched to map and retrieve the destination numbers associated with the sequencing telephone number received by database 105, as indicated in step 303. Database 105, in step 304, transmits to switch 101 call processing information which includes the first destination number listed in the sequence along with information indicative of the sum total of destination numbers in the sequence. Upon receiving the call processing information, switch 101, in step 305, completes the call to the received destination number while forwarding position data to that destination number. As indicated above, the position data indicates the relative position of a destination number in a list of such numbers in the sequence. The position data may be transmitted in-band using the ADSI protocol when the destination number is a Plain Old Telephone Service (POTS) number. Alternatively, when the end-user device is ISDN-compatible, the position data may be transmitted via the D channel of the ISDN line associated with the destination number.

When the call is completed to a destination number associated with call sequencing processor 120, the latter analyzes the position data in step 306 to determine whether the position data indicates the call is the last call in the sequence. If so, the call as well as the sequencing process is completed in a conventional manner in step 310. When the position data indicates that the call is not the last call in the sequence, as determined in step 306, the ringing tone signal for the call is suppressed by filter 203 in step 307. By preventing the ringing tone signal from reaching answering machine 122, the announcement delivery mechanism of answering machine 122 is not activated, thereby preventing premature termination of the sequence of calls. Similarly, when the call is completed to a destination number associated with PBX 107, processor 108 of PBX 107 analyzes the position data. Thereafter, depending on the content of the position data field, processor 108 may either prevent the call from being directed to PVMS 109 regardless of the number of rings associated with such call, or forward the call to PVMS 109 for voice messaging service.

If the call goes unanswered due to ring no-answer (after a predetermined number of rings) or busy-line condition, as determined in step 308, switch 101 completes a call to the next destination number listed in the sequence while forwarding position data to the device associated with that destination number, as indicated in step 309. The sequence of steps illustrated in steps 306 to 310 is repeated until the call is answered by the sequencing subscriber, as indicated in step 308, or the position data indicates that the incoming call is the last call in the sequence, as determined in step 306. For the last call in the sequence, call sequencing processor 120 allows the caller to leave a message for the sequencing subscriber.

Figure 4:
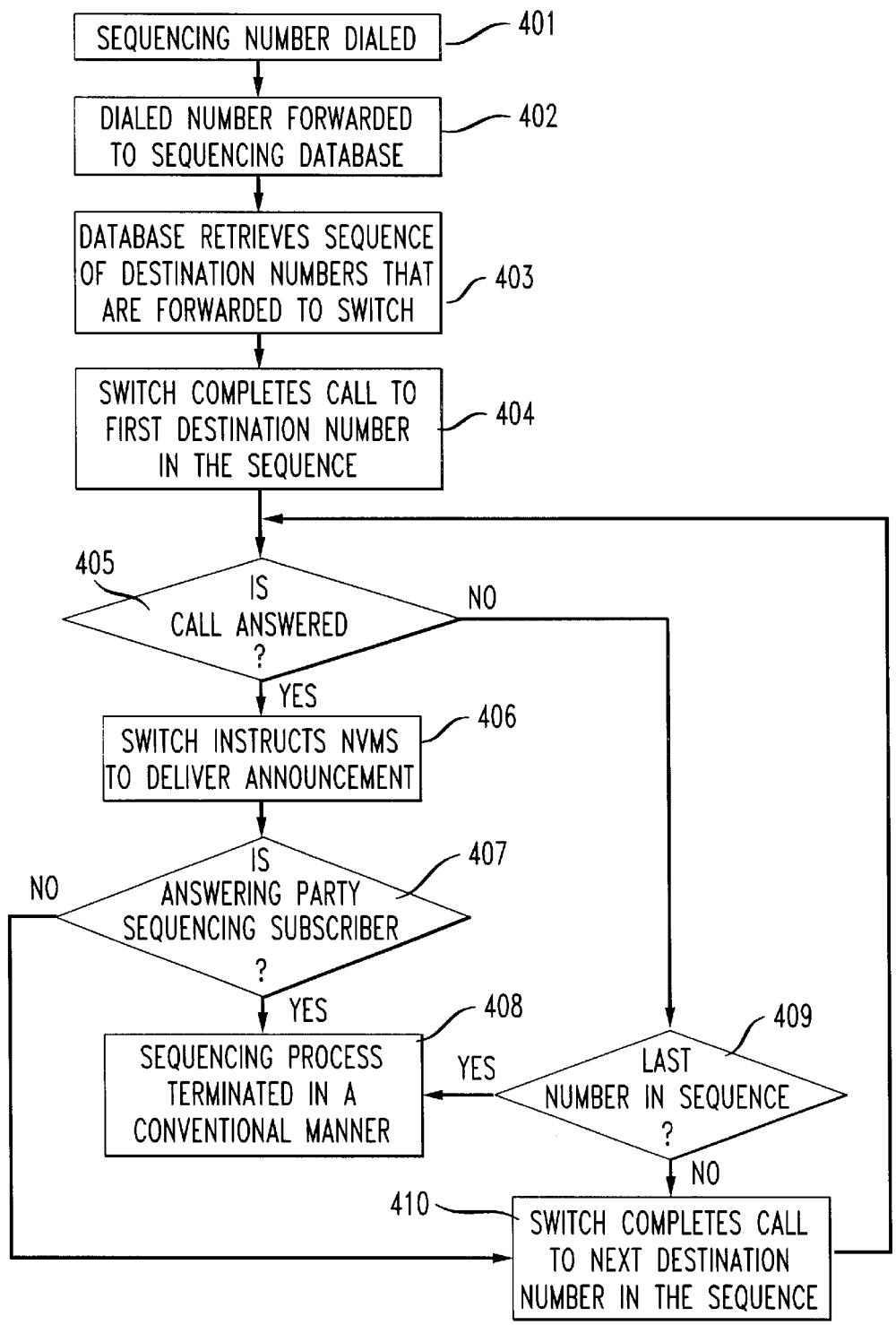

FIG. 4 presents in flow diagram format actions taken and decisions formulated by different components of FIG. 1 to implement the principles disclosed herein. An alternate process to implement the principles of this disclosure is initiated in step 401 when a user dials a sequencing number such as an 800 number to reach a sequencing subscriber. Upon receiving the dialed number, switch 101, in step 402, forwards to database 105 such number and other information associated with the call. Using conventional database management systems lookup techniques, database 105, in step 403, retrieves the destination numbers associated with the sequencing number and forwards such sequence of destination numbers to switch 101 which proceeds, in step 404, to complete a call to the first destination number in the sequence. If the call is answered, as determined in step 405, switch 101 in step 406 sends a signal to NVMS 104 instructing NVMS 104 to deliver an announcement to the party answering the call. An illustrative announcement may inform the party answering the call that the call is destined for the sequencing subscriber and to enter a particular digit on the dial pad if the answering party is the sequencing subscriber. The announcement may also instruct the answering party to enter a different digit if such party is not the sequencing subscriber. If the answering party is the sequencing subscriber, as determined in step 407 NVMS 104 splices itself out of the communication path, and the sequencing process is terminated in a conventional manner, as indicated in step 408.

If the call is not answered, as determined in step 405, switch 101 determines in step 409 whether there is any remaining number(s) in the sequence. If so, switch 101, in step 410 completes a call to the next destination number in the sequence. Switch 101 also performs step 410 upon receiving a signal from NVMS 104 indicating that the answering party is not the sequencing subscriber, as determined in step 407. Steps 405 to 410 are repeated until either the sequencing subscriber answers one of the calls in the sequence or all the destination numbers in the sequence have been exhausted.

The foregoing merely illustrates certain aspects of the invention. Persons skilled in the art will be able to devise numerous arrangements which, although not explicitly shown or described herein, embody the principles of the invention and are within its spirit and scope.

What is claimed is:

1. A network method of completing a sequencing call, said method comprising the steps of:

accessing a database to retrieve a pre-determined sequence of telephone numbers to which a call can be directed for communications between a caller and an intended party;

directing a call to a telephone number in said sequence;

receiving an answer indication from a telephone at the telephone number;

transmitting a signal requesting an authorized identification signal corresponding to the intended called party; wherein the signal requesting an authorized identification signal corresponding to the intended call party includes at least one of an in-band signal and an out-of-band signal that is connected to the telephone at the telephone number, and said in-band signal and said out-of-band signal disables a voice-messaging system corresponding to the telephone at the telephone number;

upon receiving the authorized identification signal corresponding to the intended called party, completing the call;

upon failing to receive the authorized identification signal corresponding to the intended called party, directing the call in an alternative manner, wherein the authorized identification signal corresponding to the intended called party comprises a dial pad actuation signal.

2. A network method as recited in claim 1 wherein said alternative manner of directing the call is determined by position data indicating the position of the call to the telephone number within said pre-determined sequence of telephone numbers.

3. A network method as recited in claim 2 wherein said alternative manner of directing the call includes, if the telephone number is not the last telephone number in said sequence, forwarding the call to the next telephone number in said sequence.

4. A network method as recited in claim 2 wherein said alternative manner of directing the call include, if the telephone number is the last telephone number in said sequence, terminating the telephone call.

5. A network method as recited in claim 1 wherein said in-band signal and said out-of-band signal are transmitted by a terminating switch.

* * * * *